United States Patent
Lakhman et al.

(10) Patent No.: US 11,205,526 B2
(45) Date of Patent: Dec. 21, 2021

(54) LINEAR LOW-DENSITY POLYETHYLENE POLYMERS SUITABLE FOR USE ON CABLES

(71) Applicant: General Cable Technologies Corporation, Highland Heights, KY (US)

(72) Inventors: Rubinder Kaur Lakhman, Indianapolis, IN (US); Jon Michael Malinoski, Zionsville, IN (US); Sean William Culligan, Zionsville, IN (US); Srinivas Siripurapu, Carmel, IN (US); Vijay Mhetar, Conroe, TX (US)

(73) Assignee: General Cable Technologies Corporation, Highland Heights, KY (US)

(*) Notice: Subject to any disclaimer, the term of this patent is extended or adjusted under 35 U.S.C. 154(b) by 423 days.

(21) Appl. No.: 15/863,541

(22) Filed: Jan. 5, 2018

(65) Prior Publication Data

US 2018/0190407 A1 Jul. 5, 2018

Related U.S. Application Data

(60) Provisional application No. 62/442,697, filed on Jan. 5, 2017.

(51) Int. Cl.
*H01B 3/44* (2006.01)
*C08F 210/16* (2006.01)
*H01B 7/02* (2006.01)

(52) U.S. Cl.
CPC .......... *H01B 3/441* (2013.01); *C08F 210/16* (2013.01); *H01B 7/0216* (2013.01); *C08F 2500/08* (2013.01); *C08F 2500/12* (2013.01); *C08F 2500/17* (2013.01)

(58) Field of Classification Search
None
See application file for complete search history.

(56) References Cited

U.S. PATENT DOCUMENTS

| 5,324,800 | A | | 6/1994 | Welborn, Jr. et al. |
| 5,358,792 | A | | 10/1994 | Mehta et al. |
| 5,420,220 | A | | 5/1995 | Cheruvu et al. |
| 5,763,032 | A | * | 6/1998 | Hutt .................. C08L 23/0815 428/36.1 |

(Continued)

FOREIGN PATENT DOCUMENTS

| EP | 2895547 B1 | 11/2016 |
| WO | 85/04664 A1 | 10/1985 |

(Continued)

OTHER PUBLICATIONS

Thomas, Shane; International Search Report and Written Opinion of the International Searching Authority, issued in International App. No. PCT/US2018/012613; dated Mar. 8, 2018; 8 pages.

*Primary Examiner* — Shawn Mckinnon
(74) *Attorney, Agent, or Firm* — Ulmer & Berne LLP

(57) ABSTRACT

Linear low-density polyethylene polymers used to form covering layers for cables are disclosed. Such polymers exhibit certain molecular weight distributions suitable to form the covering layers for the cable. The polymer can be crosslinked to exhibit suitable properties including retained elongation at break values and hot set values.

16 Claims, 1 Drawing Sheet

(56) References Cited

U.S. PATENT DOCUMENTS

| | | |
|---|---|---|
| 5,986,021 A | 11/1999 | Hokkanen et al. |
| 5,998,558 A | 12/1999 | Wasserman et al. |
| 6,455,616 B1 | 9/2002 | Cogen |
| 6,689,851 B1 | 2/2004 | Rowland et al. |
| 8,679,603 B1 | 3/2014 | Mavridis et al. |
| 8,846,188 B2 | 9/2014 | Fantinel et al. |
| 9,309,391 B2 | 4/2016 | Dabbous et al. |
| 2006/0116456 A1 | 6/2006 | Lin et al. |
| 2008/0227887 A1 | 9/2008 | Klier et al. |
| 2015/0376369 A1 | 12/2015 | Ranganathan et al. |
| 2016/0189829 A1 | 6/2016 | Bates et al. |
| 2017/0145131 A1 | 5/2017 | Ranganathan et al. |

FOREIGN PATENT DOCUMENTS

| | | |
|---|---|---|
| WO | 94/14855 A1 | 7/1994 |
| WO | 94/26816 A1 | 11/1994 |
| WO | 96/07680 A1 | 3/1996 |
| WO | 2016/032715 A1 | 3/2016 |

\* cited by examiner

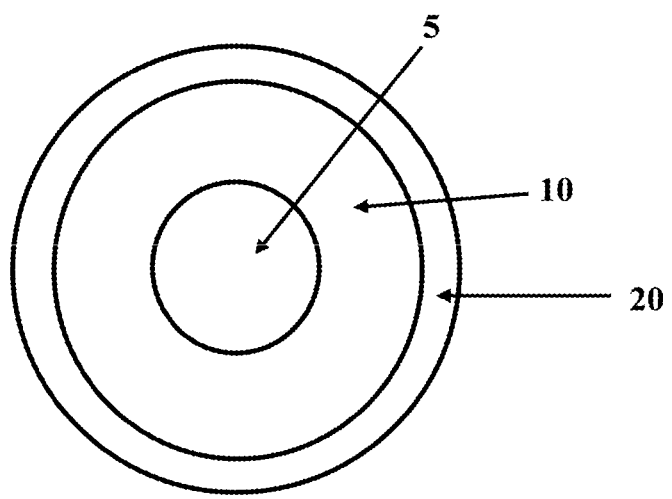

LINEAR LOW-DENSITY POLYETHYLENE POLYMERS SUITABLE FOR USE ON CABLES

REFERENCE TO RELATED APPLICATIONS

The present application claims the priority benefit of U.S. provisional application Ser. No. 62/442,697, entitled LINEAR LOW-DENSITY POLYETHYLENE POLYMERS SUITABLE FOR USE ON CABLES, filed Jan. 5, 2017, and hereby incorporates the same application herein by reference in its entirety.

TECHNICAL FIELD

The present disclosure generally relates to linear low-density polyethylene polymers suitable to form covering layers for cables.

BACKGROUND

Cables generally include one or more covering layers surrounding the conductive elements to provide the cables such features as electrical insulation and improved durability. The covering layers, usually in the form of insulation and jackets, are typically formed from polymers which exhibit properties suitable for the intended use of the cable. For example, suitable polymers can exhibit favorable elongation at break percentages, tensile strengths, adherence, and the ability to be crosslinked among other properties. It would be desirable to identify additional polymers which are suitable for the formation of coatings in the cable industry.

SUMMARY

In accordance with one example, a cable includes one or more conductive elements and a covering layer surrounding the one or more conductive elements. The covering layer is formed from a linear low-density polyethylene polymer. The linear low-density polyethylene polymer exhibits a $M_z/M_n$ molecular weight distribution of about 20 to about 40 and a melt index of 0.8 to about 2.

In accordance with another example, a cable includes one or more conductive elements and a covering layer surrounding the one or more conductive elements. The covering layer is formed from a crosslinked linear low-density polyethylene polymer. The linear low-density polyethylene polymer exhibits one or more of a $M_z/M_n$ molecular weight distribution of about 20 to about 40 and a hot set value of about 10% or less when evaluated as a crosslinked tape sample in accordance to ICEA T-28-562. The covering layer exhibits a retained elongation at break after heat aging at 121° C. for 7 days that is greater than 76% of the unaged elongation at break percentage.

In accordance with another example, a cable includes one or more conductive elements and a covering layer surrounding the one or more conductive elements. The covering layer is formed from a crosslinked linear low-density polyethylene polymer. The linear low-density polyethylene polymer exhibits a $M_z/M_n$ molecular weight distribution of about 20 to about 40. The covering layer exhibits a retained elongation at break after heat aging at 121° C. for 7 days that is greater than 76% of the unaged elongation at break percentage.

BRIEF DESCRIPTION OF THE DRAWINGS

FIG. 1 depicts a cross-sectional view of a cable including an insulation layer and a jacket layer according to one embodiment.

DETAILED DESCRIPTION

Linear low-density polyethylene ("LLDPE") polymers are a class of polymers that have an essentially linear polyethylene backbone but which exhibit low density due to their inclusion of short aliphatic side chains. In contrast to highly branched low-density polyethylene ("LDPE") polymers formed using a free radical polymerization process, LLDPE polymers are formed at lower temperatures using catalysts and small amounts of alpha-olefin co-monomers. As a result, LLDPE polymers exhibit narrower molecular weight distributions and improved resilience, tear strength, and flexibility as compared to LDPE polymers. As can be appreciated, such properties can make certain LLDPE polymers suitable for use as the base polymer of one or more covering layers (e.g., insulation and jacket layers) of a cable.

As will be appreciated however, cables require polymers to exhibit a blend of properties not typically required for other applications. Polymers used for various components for cables advantageously exhibit good processability, large elongation at break values, suitable tensile strengths, adherence, and commonly, the ability to be crosslinked.

According to certain embodiments, suitable LLDPE polymers for use in components for the cable industry can be formed by tailoring the selection of both the monomeric feed stock and the polymerization processes used to form LLDPE polymers. As will be appreciated, suitable LLDPE polymers are generally not dependent upon any single feature of the LLDPE polymerization process or feedstock, but rather through careful selection of multiple features to optimize the polymer for use as a coating layer on a cable.

As can be appreciated, a variety of suitable LLDPE polymers can be formed by varying the selection and quantity of co-monomers used to form the polymers. In certain embodiments, suitable co-monomers for the described LLDPE polymers can generally include any alpha olefin having 3 to about 20 carbon atoms including both linear and branched alpha olefins. In certain embodiments however, the co-monomer can advantageously be one or more of 1-butene, 1-hexene, and 1-octene. As can be appreciated, both the selection, and the relative quantity, of an alpha olefin co-monomer can influence the properties of the resulting LLDPE polymer by, for example, varying the size and number of side chains on the resulting LLDPE polymers as well as properties such as the molecular weight distribution and polydispersity index.

As can be appreciated, the polymerization processes used to form the LLDPE polymers can also influence various properties exhibited by the polymers. For example, in certain embodiments, the polymerization process can include a slurry phase process, in certain embodiments, a solution phase process, and in certain embodiments, a gas phase process. As can be further appreciated, suitable LLDPE polymers can be either cast or blown. Applicant has unexpectedly discovered that different processes can each produce suitable LLDPE polymers for use as covering layers for cables.

The selection of a catalyst can also influence the properties of an LLDPE polymer. In certain embodiments, suitable catalysts can include Ziegler-Natta catalysts, Philips catalysts, and other inorganic catalysts. Activating co-catalysts can also be included in certain embodiments such as, for example, aluminoxanes and boron alkyls.

Alternatively, in certain embodiments, suitable LLDPE polymers can be formed through a metallocene catalysis process. As can be appreciated, metallocene catalysis processes, using a single site catalyst, can produce LLDPE polymers of increased homogeneity due to the catalyst substantially polymerizing near identical polymers. Metallocene catalyzed LLDPE can sometimes be referred to as mLLDPE polymers. Additional details of suitable metallocene catalysis processes are disclosed in PCT Application No. WO 1994/026816; U.S. Pat. Nos. 5,324,800; 5,986,021; and 8,846,188 each of which are incorporated herein by reference.

Additional details about materials and processes for the formation of suitable LLDPE polymers are disclosed in U.S. Pat. Nos. 5,420,220; 5,998,558; PCT Application No. WO 1994/014855; and PCT Application No. WO 1996/007680 each of which are incorporated herein by reference.

As can be further appreciated, suitable LLDPE polymers can alternatively be commercially obtained from, or be producible from polymers obtained from, suppliers such as LyondellBasell Industries N.V. (e.g., Integrate®, Luflexen®, Lupolen®, Microthene®, and Petrothene® grade LLDPE polymers), Chevron Phillips Chemical (e.g., Marlex® grade LLDPE polymers), Nova Chemicals (e.g., Sclair® and Novapol® grade LLDPE polymers), ExxonMobil Chemical, Ineos (e.g., Enable® and Eltex® grade LLDPE polymers), Dow Chemical Co. (e.g., Tuflin™ grade LLDPE polymers), Univation Technologies (e.g., XCAT' grade LLDPE polymers), Sabic, and Versalis S.p.A (e.g., Flexirene® grade LLDPE polymers).

Applicant has discovered that suitable LLDPE polymers for cable applications are polymers which exhibit a balance of properties which LLDPE polymers for cables are not typically optimized for. In certain embodiments for example, suitable LLDPE polymers can exhibit a controlled molecular weight distribution different from known LLDPE polymers for cable applications. In certain embodiments, suitable LLDPE polymers can also exhibit a balance of excellent dynamic mechanical rheology viscosities, good polydispersity indexes, high peak melting temperatures, and controlled melt indexes. Additionally, suitable LLDPE polymers can form crosslinked covering layers which exhibit favorable hot set values and can retain favorable elongation at break values after heat aging. In certain embodiments, suitable LLDPE polymers can also exhibit high tensile strengths and elongation at break percentages when applied as a thermoplastic polymer to cables.

As can be appreciated, power cables can be formed in a variety of configurations including as single-core cables, multi-core cables, tray cables, inter-locked armored cables, and continuously corrugated welded ("CCW") cable constructions. The conductors in such power cables can be surrounded by one or more insulation layers and/or jacket layers. According to certain embodiments, one or more of such insulation layers or jacket layers can be formed with the LLDPE polymers as described herein.

An illustrative, single-core, power cable is depicted in FIG. 1. The single-core power cable in FIG. 1 includes a conductor 5, an insulation layer 10, and a jacket layer 20. Either, or both, of the insulation layer 10 and the jacket layer 20 can be formed of a linear low-density polyethylene polymer as described herein. The insulation layer can be crosslinked in certain embodiments. As can be appreciated, many variations are possible. For example, power cables can be constructed with a plurality of conductors, a composite core, an insulation shield, neutral wires, and/or additional insulation or jacket layers in various embodiments.

As can be appreciated, an insulation or jacket layer formed of the LLDPE polymers described herein can include a number of additional components to form suitable covering layers. For example, such covering layers can include one or more fillers, colorants, antioxidants, stabilizers, flame retardants, and processing aids in various embodiments.

Fillers can be included in certain embodiments to modify various properties of the compositions formed from the LLDPE polymers described herein. Suitable fillers can include talc, calcined clay, and combinations thereof. Particles of the filler can vary in size and can have an average particle size between about 50 nm to about 200 microns according to certain embodiments. Filler particles can also vary in shape, including spherical, hexagonal, platy, tabular, etc. shapes. In certain embodiments, the average particle size of a portion of the filler can also be selected. For example, in certain embodiments, about 80%, or more, of the particles in the filler can have an average particle size of about 20 microns or less.

As can be appreciated, colorants can be added to color a covering layer, particularly an outer layer. Suitable colorants can include, but are not limited to cadmium red, iron blue, or combinations thereof. As can be appreciated, carbon black can also be used, or can act, as a colorant.

According to certain embodiments, suitable antioxidants for inclusion in an covering layer formed of an LLDPE polymer described herein can include amine-antioxidants, such as 4,4'-dioctyl diphenyl amine, N,N'-diphenyl-p-phenylenediamine, and polymers of 2,2,4-trimethyl-1,2-dihydroquinoline; phenolic antioxidants, such as thiodiethylene bis[3-(3,5-di-tert-butyl-4-hydroxyphenyl)propionate], 4,4'-thiobis(2-tert-butyl-5-methylphenol), 2,2'-thiobis(4-methyl-6-tert-butyl-phenol), benzenepropanoic acid, 3,5-bis(1,1-dimethylethyl)4-hydroxy benzenepropanoic acid, 3,5-bis(1,1-dimethylethyl)-4-hydroxy-C13-15 branched and linear alkyl esters, 3,5-di-tert-butyl-4hydroxyhydrocinnamic acid C7-9-branched alkyl ester, 2,4-dimethyl-6-t-butylphenol tetrakis{methylene-3-(3',5'-ditert-butyl-4'-hydroxyphenol) propionate}methane or tetrakis {methylene3-(3',5'-ditert-butyl-4'-hydrocinnamate}methane, 1,1,3tris(2-methyl-4-hydroxyl-5-tbutylphenyl)butane, 2,5,di t-amyl hydroquinone, 1,3,5-tri methyl2,4,6tris(3,5di tert butyl-4-hydroxybenzyl) benzene, 1,3,5tris(3,5di-tert-butyl-4-hydroxybenzyl)isocyanurate, 2,2-methylene-bis-(4-methyl-6-tert butyl-phenol), 6,6'-di-tert-butyl-2,2'-thiodi-p-cresol or 2,2'-thiobis(4-methyl-6-tert-butylphenol), 2,2-ethylenebis(4,6-di-t-butylphenol), triethyleneglycol bis {3-(3-t-butyl-4-hydroxy-5methylphenyl)propionate}, 1,3,5-tris(4tert-butyl-3-hydroxy-2,6-dimethylbenzyl)-1,3,5-triazine-2,4,6-(1H,3H, 5H)trione, 2,2-methylenebis {6-(1-methylcyclohexyl)-p-cresol}; sterically hindered phenolic antioxidants such as pentaerythritol tetrakis(3-(3,5-di-tert-butyl-4-hydroxyphenyl)propionate); hydrolytically stable phosphite antioxidants such as tris(2,4-ditert-butylphenyl)phosphite; and/or sulfur antioxidants, such as bis(2-methyl-4-(3-n-alkylthiopropionyloxy)-5-t-butylphenyl)sulfide, 2-mercaptobenzimidazole and its zinc salts, pentaerythritol-tetrakis(3-laurylthiopropionate), and combinations thereof. Antioxidants can be included in a composition in amounts at about 1%, by weight, or less in certain embodiments; at about 0.5%, by weight, or less in certain embodiments; at about 0.4%, by weight, or less in certain embodiments; and at about 0.2%, by weight, or less in certain embodiments. In certain embodiments, it can be advantageous to use a blend of multiple antioxidants such as a blend of a sterically hindered phenolic antioxidant and a hydrolytically stable phosphite antioxidant.

According to certain embodiments, the compositions formed from the LLDPE polymers described herein can include one or more of an ultraviolet ("UV") stabilizer, a light stabilizer, a heat stabilizer, a lead stabilizer, a metal deactivator, and any other suitable stabilizer.

Suitable UV stabilizers can be selected from, for example, compounds including: benzophenones, triazines, banzoxazinones, benzotriazoles, benzoates, formamidines, cinnamates/propenoates, aromatic propanediones, benzimidazoles, cycloaliphatic ketones, formanilides, cyanoacrylates, benzopyranones, salicylates, and combinations thereof. Specific examples of UV stabilizers can include 2,2''-methylenebis(6-(2H-benzotriazol-2-yl)-4-4(1,1,3,3,-tetramethyl-butyl) phenol, available as LA-31 RG from Adeka Palmarole (Saint Louis, France) having CAS #103597-45-1; and 2,2'-(p-phenylene) bis-4-H-3,1-benzoxazin-4-one, available as Cyasorb UV-3638 from Cytec Industries (Stamford, Conn.) and having CAS #18600-59-4.

Hindered amine light stabilizers ("HALS") can be used as a light stabilizer according to certain embodiments. HALS can include, for example, bis(2,2,6,6-tetramethyl-4-piperidyl)sebaceate; bis(1,2,2,6,6-tetramethyl-4-piperidyl)sebaceate with methyl 1,2,2,6,6-tetrameth-yl-4-piperidyl sebaceate; 1,6-hexanediamine, N,N'-bis(2,2,6,6-tetramethyl-4-piperidyl)polymer with 2,4,6 trichloro-1,3,5-triazine; reaction products with N-butyl2,2,6,6-tetramethyl-4-piperidinamine; decanedioic acid; bis(2,2,6,6-tetramethyl-1-(octyloxy)-4-piperidyl)ester; reaction products with 1,1-dimethylethylhydroperoxide and octane; triazine derivatives; butanedioc acid; dimethylester, polymer with 4-hydroxy-2,2,6,6-tetramethyl-1-piperidine ethanol; 1,3,5-triazine-2,4,6-triamine,N,N'''-[1,2-ethane-diyl-bis[[[4,6-bis-[butyl(1,2,2,6,6pentamethyl-4-piperadinyl)amino]-1,3,5-triazine-2-yl]imino-]-3,1-propanediyl]]bis[N',N''-dibutyl-N', N''bis(2,2,6,6-tetramethyl-4-pipe-ridyl); bis (1,2,2,6,6-pentamethyl-4-piperidinyl) sebacate; poly[[6-[(1,1,3,3-terramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]; benzenepropanoic acid; 3,5-bis(1,1-dimethyl-ethyl)-4-hydroxy-C7-C9 branched alkyl esters; and isotridecyl-3-(3,5-di-tert-butyl-4-hydroxy-phenyl) propionate. In one embodiment, a suitable HALS can be bis(1,2,2,6,6-pentamethyl-4-piperidinyl) sebacate.

Suitable heat stabilizers can include 4,6-bis (octylthiomethyl)-o-cresol dioctadecyl 3,3'-thiodipropionate; poly[[6-[(1,1,3,3-terramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]; benzenepropanoic acid; 3,5-bis(1,1-dimethyl-ethyl)-4-hydroxy-C7-C9 branched alkyl esters; and isotridecyl-3-(3,5-di-tert-butyl-4-hydroxyphenyl) propionate. According to certain embodiments, the heat stabilizer can be 4,6-bis (octylthiomethyl)-o-cresol; dioctadecyl 3,3'-thiodipropionate and/or poly[[6-[(1,1,3,3-terramethylbutyl)amino]-1,3, 5-triazine-2,4-diyl][2,2,6,6-tetramethyl-4-piperidinyl) imino]-1,6-hexanediyl[(2,2,6,6-tetramethyl-4-piperidinyl) imino]].

A lead stabilizer can include a lead oxide, such as for example, red lead oxide $Pb_3O_4$. However, as will be appreciated, any other suitable lead stabilizer can also be used alone or in combination with red lead oxide. In some embodiments, however, the covering layer composition can alternatively be substantially lead-free. As will be appreciated, lead-free compositions can be advantageous for safety reasons and can allow for wider usage of the compositions.

A metal deactivator can include, for example, N,N'-bis (3-(3,5-di-t-butyl-4-hydroxyphenyl)propionyl)hydrazine, 3-(N-salicyloyl)amino-1,2,4-triazole, and/or 2,2'-oxamidobis-(ethyl 3-(3,5-di-t-butyl-4-hydroxyphenyl)propionate).

Flame retardants can be included to improve the flame characteristics of a covering layer. For example, a flame retardant can be included to minimize the spread of flame or to make ignition more difficult. Suitable flame retardants can include metal oxides, metal hydroxides, silicate-based fillers, and combinations thereof. Metal oxides can include, for example, aluminum oxide, magnesium oxide, iron oxide, zinc oxide, and combinations thereof. Metal hydroxides can include magnesium hydroxide, magnesium carbonate hydroxide, aluminum hydroxide, aluminum oxide hydroxide (e.g., "boehmite"), magnesium calcium carbonate hydroxide, zinc hydroxide and combinations thereof. Additionally, in certain outer layer or inner layer compositions, an inorganic flame retardant can also include phosphorus flame retarders. Examples of such phosphorus flame retarders can include phosphoric acid compounds, polyphosphoric acid compounds, and red phosphorus compounds. In certain embodiments, suitable flame retardants can include one or more of kaolin, mica, talc, and silicon dioxide.

The flame retardant can further have a variety of suitable properties. For example, flame retardants can have an average particle size of about 50 nm to about 500 microns. In certain embodiments, the average particle size can be about 0.8 micron to about 2.0 microns. And in certain embodiments, the average particle size can be about 0.8 micron to about 1.2 microns. Particles of the flame retardant can also vary in shape and can include spherical, hexagonal, play, tabular, platelet shapes, and other suitable shapes.

A processing aid can be used to improve the processability of a covering layer formed from the LLDPE polymers described herein by forming a microscopic dispersed phase within a polymer carrier. During processing, the applied shear can separate the processing aid (e.g., processing oil) phase from the carrier polymer phase. The processing oil can then migrate to the die wall to gradually form a continuous coating layer to reduce the backpressure of the extruder and reduce friction during extrusion. The processing aid can generally be a lubricant, such as, stearic acid, silicones, anti-static amines, organic amities, ethanolamides, mono- and di-glyceride fatty amines, ethoxylated fatty amines, fatty acids, zinc stearate, stearic acids, palmitic acids, calcium stearate, zinc sulfate, oligomeric olefin oil, or combinations thereof. In certain embodiments, a processing aid can be included at about 1% or less, by weight of the LLDPE covering layer composition. In certain embodiments, an LLDPE covering layer composition can also be substantially free of any processing aid. As used herein, "substantially free" means that the component is not intentionally added to the composition and, or alternatively, that the component is not detectable with current analytical methods.

A processing aid can alternatively be a blend of fatty acids, such as the commercially available products: Struktol® produced by Struktol Co. (Stow, Ohio), Akulon® Ultraflow produced by DSM N.V. (Birmingham, Mich.), MoldWiz® produced by Axel Plastics Research Laboratories (Woodside, N.Y.), and Aflux® produced by Rhein Chemie (Chardon, Ohio).

In embodiments where the covering layers are to be crosslinked, a catalyst can be further included to improve the ease and/or extent of crosslinking. Examples of suitable catalysts can include dibutyltincarboxylates such as dibutyltin dilaurate, dibutyltin diacetate ("DBTDA"), stannous acetate, stannous octoate, dibutyltin, dioctoate, and di-octyltin-bis (isooctylthioglycolate). As can be appreciated, other compounds can also act as catalysts including certain sulfonic acids, and other acids and bases including acid/base catalysts, Lewis acid and Brønsted-Lowry acids, and other organic and inorganic bases. Such catalysts can be provided as part of a masterbatch in certain embodiments.

As can be appreciated, a covering layer can be prepared by blending the components/ingredients in conventional masticating equipment, for example, a rubber mill, brabender mixer, banbury mixer, buss ko-kneader, farrel continuous mixer, or twin screw continuous mixer. In certain examples, each of the components, other than the LLDPE described herein, can be premixed and then added to the LLDPE. The mixing time can be selected to ensure a homogenous mixture.

The compositions including the LLDPE polymers described herein can be extruded around a conductor to form a conductive cable having advantageous physical, mechanical, and electrical properties. In a typical extrusion method, an optionally heated conductor can be pulled through a heated extrusion die, generally a cross-head die, to apply a layer of a melted inner layer composition onto the conductor. Upon exiting the die, the conducting core with the applied inner layer composition can be passed through a heated vulcanizing section, or continuous vulcanizing section and then a cooling section, generally an elongated cooling bath, to cool. Multiple polymer layers can be applied by consecutive extrusion steps in which an additional layer is added in each step. However, as can be appreciated, alternative extrusion methods can also be used. For example, a tandem extrusion curing process can be used. In a tandem extrusion curing process, each of the various polymer layers are extruded individually and then all of the polymer layers are cured in a single curing step. Alternatively, certain extrusion dies, sometimes called tandem extrusion dies, can be used to simultaneously apply multiple polymer layers in a single step. After extrusion with a tandem extrusion die, all of the polymer layers can then be optionally cured in a single curing step.

The conductor, or conductive element, of a power cable, can generally include any suitable electrically conducting material. For example, a generally electrically conductive metal such as, for example, copper, aluminum, a copper alloy, an aluminum alloy (e.g. aluminum-zirconium alloy), or any other conductive metal can serve as the conductive material. As will be appreciated, the conductor can be solid, or can be twisted and braided from a plurality of smaller conductors. The conductor can be sized for specific purposes. For example, a conductor can range from a 1 kcmil conductor to a 1,500 kcmil conductor in certain embodiments, a 4 kcmil conductor to a 1,000 kcmil conductor in certain embodiments, a 50 kcmil conductor to a 500 kcmil conductor in certain embodiments, or a 100 kcmil conductor to a 500 kcmil conductor in certain embodiments. The voltage class of a power cable including such conductors can also be selected. For example, a power cable including a 1 kcmil conductor to a 1,500 kcmil conductor and an insulating layer formed from a suitable thermoset composition can have a voltage class ranging from about 1 kV to about 150 kV in certain embodiments, or a voltage class ranging from about 2 kV to about 65 kV in certain embodiments.

As used herein, low voltage means voltages of about 1 kV or less. As used herein, medium voltage means voltages between about 1 kV and about 69 kV. As used herein, high voltage means voltages of about 69 kV or more.

In certain embodiments, low voltage cables can include an insulation layer and in certain embodiments, medium voltage cables can include a crosslinked insulation layer and a jacket layer.

A. Dynamic Mechanical Rheology Viscosities

It has been discovered that suitable LLDPE polymers for use to form covering layers for cables can have dynamic mechanical rheology viscosity ratios ($\eta*0.01/\eta*100$) of less than about 36 in certain embodiments, about 2 to about 36 in certain embodiments, and about 3 to about 8 in certain embodiments. Methods used to measure the dynamic mechanical rheology viscosities are described in the Examples section herein.

B. Gel Permeation Chromatography

The suitability of LLDPE polymers to be used in the cabling industry was also found to be dependent on the molecular weight and molecular weight distributions of the polymers. High temperature gel permeation chromatography was used to evaluate LLDPE polymers using the methods described in the Examples section herein. Suitable LLDPE polymers can exhibit a polydispersity index ($M_w/M_n$) of about 2.5 to about 8 in certain embodiments, about 2.5 to about 6 in certain embodiments, about 3 to about 5 in certain embodiments, and about 3.5 to about 4.5 in certain embodiments. Suitable LLDPE polymers can also exhibit molecular weight distributions comparing the size average molecular weight (also referred to as the Z average) to the number average molecular weight ($M_z/M_n$). In certain embodiments, suitable LLDPE polymers can have a $M_z/M_n$ distribution of about 20 to about 40 in certain embodiments, or any range formed by any of the preceding values such as about 25 to about 40 in certain embodiments, about 26 to about 36 in certain embodiments, etc.

In certain embodiments, suitable LLDPE polymers were found to exhibit higher molecular weights. For example, particularly suitable LLDPE polymers can have a number average molecular weight of ($M_n$) of about 30,000 daltons to about 40,000 daltons in certain embodiments, and about 32,000 daltons to about 39,000 daltons in certain embodiments. In certain embodiments, suitable LLDPE polymers can have a weight average molecular weight ($M_w$) of about 120,000 daltons to about 170,000 daltons, or about 140,000 daltons to about 170,000 daltons. Suitable LLDPE polymers can also exhibit a size average (or Z-average) ($M_z$) of about 900,000 daltons to about 1,200,000 daltons in certain embodiments. Additionally, suitable LLDPE polymers can have a high molecular weight shoulder.

C. Differential Scanning Calorimetry

Suitable LLDPE polymers for use in forming covering layers for cables were also found to have higher peak melting temperatures. Differential scanning calorimetry was performed after melting and then reheating the samples. According to certain embodiments, suitable LLDPE polymers can have a peak melting temperature of about 117° C. or greater, about 120° C. or greater, or about 124° C. or greater. In certain embodiments, a peak melting temperature can be about 119° C. to about 127° C.

Suitable LLDPE polymers for use in forming covering layers for cables can also have a melt index of 0.8 to about 2.0 in certain embodiments, or any range formed by any of the preceding values such as a melt index of about 0.9 to about 2.0, etc.

As will be appreciated, suitable LLDPE polymers can also meet a variety of other requirements to improve their suitability for use in the cable industry including meeting minimum standards for, surface quality, tensile strength, elongation at break percentage, and heat deformation values.

As can be appreciated, cables benefit from polymers which form smooth surfaces free of defects. LLDPE polymers suitable for use in forming covering layers for cables can form smooth tapes when extruded into 1" wide tapes.

ICEA S-64-649 details the tensile strength and retained tensile strength values required for polymers to be suitable for thermoplastic coverings for cables. For example, ICEA S-64-649 requires polymers to have an initial tensile strength of 1700 psi when evaluated using unaged dumbbells pulled at 20 in/min. ICEA S-64-649 also requires polymers to retain, after heat aging at 100° C. for 48 hours, a tensile strength and elongation at break percentage of about 75% or more of the respective unaged values. Suitable LLDPE polymers can pass each of these requirements of ICEA S-64-649.

As can be appreciated, the mechanical properties of suitable LLDPE polymers can also be evaluated by determining their heat deformation. According to certain embodiments, suitable LLDPE polymers can pass the ICEA S-64-649 heat deformation test as demonstrated by tape samples having less than a 30% deformation when a load of 2000 g was applied for 30 minutes under 100° C. conditions.

Suitable LLDPE samples can also demonstrate their durability by passing an Environmental Stress Crack Resistance ("ESCR") test defined by ICEA S-64-649 and ASTM D1693. In the ESCR test, 10 samples (⅛ inch by 1½ inch by ½ inch each) are submerged in a 10% IGEPAL® solution for 48 hours at 50° C. and a polymer passes if less than five of the ten samples crack.

In certain embodiments, suitable LLDPE polymers can also be extruded as an 80 mil coating around a 1/0 AWG aluminum conductor.

In certain embodiments, the LLDPE polymers described herein can also be crosslinked using a suitable process. For example, the described LLDPE polymers can be crosslinked using a peroxide crosslinking agent and a continuous vulcanization tube, or crosslinked using a silane grafted copolymer and a moisture curing process. As can be appreciated, such processes can have many variations. For example, silane crosslinking processes can occur in a single step process which both grafts a silane onto the polymer and crosslinks the polymer. In certain such embodiments, peroxide can be used to initiate the grafting process.

In other embodiments, a two-step process with separate grafting and crosslinking steps can be used. In such embodiments, the first step can use peroxide to graft silane to polyethylene (such as a suitable LLDPE). In a second step, the silane-grafted polyethylene can then be blended with additional polymer (e.g., a suitable LLDPE) and extruded onto a cable. Crosslinking can occur through exposure to ambient air, hot water, or steam. Heat can be applied during extrusion or in a separate step.

Examples of suitable silane compounds to be grafted onto the polymers described herein can include can include one or more of a monomeric vinyl silane, an oligomeric vinyl silane, a polymeric vinyl silane and an organosilane compound. Suitable organosilane compounds can include: γ-methacryloxypropyltrimethoxysilane, methyltriethoxysilane, methyltris(2-methoxyethoxy)silane, dimethyldiethoxysilane, vinyltris(2-methoxyethoxy)silane, vinyltrimethoxysilane, vinyltriethoxysilane, octyltriethoxysilane, isobutyltriethoxysilane, isobutyltrimethoxysilane, propyltriethoxysilane, vinyl triacetoxy silane, and mixtures or polymers thereof.

Examples of suitable peroxide crosslinking compounds can include α,α'-bis(tert-butylperoxy) disopropylbenzene, di(tert-butylperoxyisopropyl)benzene, dicumyl peroxide, and tert-butylcumyl peroxide. Blends of multiple peroxide crosslinking agents can also be used, including, for example, a blend of 1,1-dimethylethyl 1-methyl-1-phenylethyl peroxide, bis(1-methyl-1-phenylethyl) peroxide, and [1,3 (or 1,4)-phenylenebis(1-methylethylidene)] bis(1,1-dimethylethyl) peroxide.

As can be further appreciated however, still other crosslinking methods can also be suitable such as the use of radiation crosslinking, heat crosslinking, electron beam crosslinking, addition crosslinking, or platinum cured crosslinking. Additional details about the above crosslinking methods, and other suitable crosslinking methods are described in U.S. patent application Ser. No. 15/360,521; U.S. Patent App. No. 2015/0376369; and U.S. Patent App. No. 2016/0189829 each incorporated herein by reference.

In embodiments where the LLDPE polymer is crosslinked before, during application to, or on a cable, suitable crosslinked LLDPE polymers can exhibit a variety of properties. Before crosslinking, suitable LLDPE polymers can exhibit similar rheology values as LLDPE polymers intended for use as thermoplastic coatings. Suitable LLDPE polymers for crosslinked coverings however can also demonstrate excellent crosslinked tensile strength and elongation at break results according to ICEA S-81-570 § 5.2 and excellent hot creep and hot set values according to ICEA T-28-562 and UL 44. Suitable LLDPE polymers can pass the ICEA S-81-570 § 5.2 requirements by exhibiting an initial tensile strength of 1800 psi or more and can pass the ICEA T-28-562 and UL 44 hot creep and hot set requirements by having a hot creep of 175% or less and a hot set of 10% or less.

Additionally, LLDPE polymers suitable to form crosslinked coverings can form smooth, 30 mil, crosslinked coatings on 14 AWG copper conductors.

Examples

Tables 1 to 2 disclose the details and physical measurements of several Inventive and Comparative LLDPE polymers. Table 1 discloses Inventive Examples suitable for any cable covering layer including crosslinked covering layers. Tables 2A and 2B discloses Comparative Examples of LLDPE polymers unsuitable for cable covering layers.

Molecular weight and related measurements for Tables 1 to 2 were measured using High Temperature Gel Permeation Chromatography (labeled as "GPC Mol. Wt." in Tables 1 to 3) using a Malvern Viscotek TDA 350A High Temperature GPC instrument, equipped with an autosampler. All measurements were performed at 160° C. Three sets of GPC columns TSK gel GMHhr-H(S) HT, each having a 13 µm average particle size, and column sizes of 300×7.8 mm (ID) were used. The GPC was equipped with three independent detectors that probed light scattering, differential refractive indexes and viscosity from the injected solutions. All three detectors were calibrated using narrow MWD polystyrene standard ($M_w$=105K) obtained from Malvern and data was reported relative to these standards. LLDPE samples were dissolved in 1,2,4-trichlorobenzene containing 500 ppm butylated hydroxytoluene at 160° C. The flow rate used was 1 mL/min and the injection volume was 200 µL. The chromatograms were analysed using software supplied by Malvern to obtain moments of the molecular weight distribution: $M_n$, $M_w$ and $M_z$. The polydispersity index was calculated as $M_w/M_n$.

Rheology experiments (labeled as Parallel Plate Viscosity in Tables 1 to 3) were performed on a strain controlled rheometer (ARES G2—Advanced Rheometric Expansion System, TA Instruments). All experiments were carried out using 25 mm parallel plates in a nitrogen atmosphere at 200° C. Initially a strain sweep was performed at a frequency of 1 rad/s to obtain the linear response region. Subsequently, frequency sweep measurements were carried out in a range of 0.01 to 100 rad/s, at a strain of 10% that is in the linear viscoelastic region. TA Orchestrator software was used to calculate frequency dependent dynamic moduli, G' (elastic modulus) and G'' (loss modulus). The frequency dependent complex viscosity, $\eta^*$ was calculated as $(G'^2+G''^2)^{1/2}/\omega$. Shear thinning was calculating by determining the ratio of complex viscosities at low frequency to that at high frequency ($\omega$=100 rad/s).

TABLE 1

| | | Inventive Example | | | |
|---|---|---|---|---|---|
| | | 1 | 2 | 3 | 4 |
| Monomer-(B)utene or (H)exene | | H | H | B | B |
| Density | | 0.919 | 0.918 | 0.918 | 0.918 |
| Metallocene Catalyst | | No | No | No | No |
| Parallel Plate Viscosity | $\eta^* 0.01/\eta^* 100$ | 4.21 | 7.51 | 4.36 | 3.39 |
| GPC Mol. Wt. | $M_z/M_n$ | 36.18 | 26.63 | 34.49 | 31.64 |
| | PDI = $M_w/M_n$ | 4.21 | 4.33 | 3.82 | 4.11 |
| | $M_n$ (Daltons) | 33195 | 38756 | 32238 | 30472 |
| | $M_w$ (Daltons) | 139725 | 167686 | 123171 | 125373 |
| | $M_z$ (Daltons) | 1201000 | 1032000 | 1112000 | 964067 |
| DSC (Reheating) | Peak Melt Temp | 124.1 | 125.3 | 120.2 | 121.4 |
| | Enthalpy | 127.3 | 135.6 | 135.2 | 127.8 |
| Melt Index | | 2.00 | 0.90 | 2.00 | 2.00 |

TABLE 2A

| | | Comparative Ex. | | | | |
|---|---|---|---|---|---|---|
| | | 5 | 6 | 7 | 8 | 9 |
| Monomer-(B)utene or (H)exene | | — | — | B | B | H |
| Density | | 0.92 | — | 0.918 | 0.918 | 0.918 |
| Metallocene Catalyst | | No | No | No | Yes | Yes |
| Parallel Plate Viscosity | $\eta^* 0.01/\eta^* 100$ | 36.2 | 61.7 | 4.07 | 13.11 | 1.88 |
| GPC Mol. Wt. | $M_z/M_n$ | 51.72 | 81.58 | 18.35 | 6.04 | 3.66 |
| | PDI = $M_w/M_n$ | 10.59 | 10.49 | 4.89 | 2.99 | 1.83 |
| | $M_n$ (Daltons) | 11098 | 11292 | 22718 | 32431 | 44020 |
| | $M_w$ (Daltons) | 117496 | 118423 | 110975 | 97203 | 80359 |
| | $M_z$ (Daltons) | 574022 | 921242 | 416944 | 195928 | 161054 |
| DSC (Reheat.) | Peak Melt Temp | 117.6 | 117.6 | 119.8 | 113.7 | 109.6 |
| | Enthalpy | 135.5 | 135.5 | 132.3 | 136.7 | 122.4 |
| Melt Index | | 0.75 | 0.70 | 2.00 | 2.00 | 4.50 |

TABLE 2B

| | | Comparative Ex. | | | |
|---|---|---|---|---|---|
| | | 10 | 11 | 12 | 13 |
| Monomer-(B)utene or(H)exene | | B | B | H | B |
| Density | | 0.925 | 0.924 | 0.926 | 0.918 |
| Metallocene Catalyst | | No | No | No | No |
| Parallel Plate Viscosity | $\eta^* 0.01/\eta^* 100$ | 3.09 | 3.26 | 90 | 8.71 |

TABLE 2B-continued

|  |  | Comparative Ex. | | | |
| --- | --- | --- | --- | --- | --- |
|  |  | 10 | 11 | 12 | 13 |
| GPC | $M_z/M_n$ | 13.5 | 13.81 | 44.72 | 16.36 |
| Mol. Wt. | PDI = $M_w/M_n$ | 3.26 | 3.31 | 8.21 | 3.48 |
|  | $M_n$ (Daltons) | 25479 | 25455 | 15951 | 50567 |
|  | $M_w$ (Daltons) | 82949 | 84266 | 130978 | 176091 |
|  | $M_z$ (Daltons) | 344076 | 351438 | 713405 | 827269 |
| DSC (Reheat.) | Peak Melt Temp | 122.0 | 122.1 | 125.8 | 122.3 |
|  | Enthalpy | 153.1 | 149.1 | 133.1 | 128.9 |
|  | Melt Index | 3.60 | 3.50 | 3.30 | 0.50 |

As illustrated by Tables 1 to 2, Inventive and Comparative LLDPE polymers can be similarly formed despite diverging in their respective suitability for cable applications based on physical properties such as rheologies, molecular weight distributions, and peak melting temperatures.

Tables 3 to 4 depict further testing of the LLDPE polymers disclosed in Tables 1 to 2. Specifically, Tables 3 to 4 depict the results of further testing of the LLDPE polymers of Tables 1 to 2 using extruded tape samples with Table 3 corresponding to the Examples of Table 1, and Tables 4A and 4B to the Examples of Tables 2A and 2B.

The tensile strength and elongation at break values depicted in Tables 3 to 4 were tested in accordance to ICEA S-64-549 on tape samples. The ESCR, or environmental Stress Crack Resistance test, was performed in accordance to ASTM D1693 and reports the number of samples (out of 10) that cracked. The heat deformation test was performed in accordance to ICEA S-64-649.

TABLE 3

|  | Inventive Example | | | |
| --- | --- | --- | --- | --- |
|  | 1 | 2 | 3 | 4 |
| Surface Quality - Tapes | Pass | Pass | Pass | Pass |
| Tensile + Initial Tensile | 4176.6 | 3674.5 | 3615.68 | 2767.7 |
| Elongation Initial Elongation | 1015.2 | 831.3 | 950 | 892.9 |
| Retained Tensile % | 95.58 | 112.23 | 84.86 | 92.93 |
| Retained Elongation % | 97.54 | 91.28 | 84.15 | 87.32 |
| Heat Deformation | 3% | 8% | 5% | 3% |
| ESCR | 100% | 100% | 100% | 100% |

TABLE 4A

|  |  | Comparative Example | | | | |
| --- | --- | --- | --- | --- | --- | --- |
|  |  | 5 | 6 | 7 | 8 | 9 |
| Surface Quality - Tapes |  | Pass | Pass | Pass | Pass | Pass |
| Tensile + Elong. | Initial Tensile | 2380 | 2399 | 2880 | 5202.3 | 5416 |
|  | Initial Elongation | 652.5 | 702.2 | 811.3 | 725.5 | 766.2 |
|  | Retained Tensile % | 107.7 | 97.5 | 92.38 | 89.55 | 99.55 |
|  | Retained Elongation % | 111.7 | 106.3 | 95.66 | 97.14 | 100.11 |
| Heat Deformation |  | 0% | 2.70% | 2% | 3% | 3% |
| ESCR |  | 100% | 100% | 100% | 100% | 100% |

TABLE 4B

|  |  | Comparative Example | | | |
| --- | --- | --- | --- | --- | --- |
|  |  | 10 | 11 | 12 | 13 |
| Surface Quality - Tapes |  | Pass | Pass | Dull | — |
| Tensile + Elong. | Initial Tensile | 2534 | 2627 | 3939 | — |
|  | Initial Elongation | 868 | 772.3 | 824.9 | — |
|  | Retained Tensile % | 70.63 | 80.37 | 81.85 | — |
|  | Retained Elongation % | 69.98 | 83.01 | 97.61 | — |
| Heat Deformation |  | 1% | 0.30% | 1.50% | — |
| ESCR |  | 100% | 100% | 100% | — |

Tables 5, 6A, and 6B depict the results of further testing of the LLDPE polymers of Tables 1, 2A, and 2B using crosslinked samples. Table 5 corresponds to the Inventive Examples of Table 1. Tables 6A and 6B correspond to the Comparative Examples of Tables 2A and 2B.

Surface quality indicates whether the sample had a smooth finish. Tensile strength and elongation at break measurements were performed in accordance to ICEA S-81-570 § 5.2. Retained tensile strength and retained elongation at break indicates the percentage retained of the corresponding unaged value after the crosslinked samples are aged for 7 days at 121° C.

Hot creep and hot set values were performed on tape samples and were tested in accordance to ICEA T-28-562. As can be appreciated, hot creep and hot set values indicate the extent of crosslinking.

Three sets of dry electrical testing were performed including SIC, Tan δ, and Plaque IR. Each set of dry electrical parameters was evaluated at room temperature ("RT" e.g., at about 23° C.), 90° C., and 130° C.

Wire extrusion surface indicates the surface quality after a 30 mil crosslinked extrusion was performed on a 14 AWG gauge copper conductor.

Hot creep and hot set values for crosslinked wires were tested in accordance to ICEA T-28-562. Deformation for the crosslinked wire samples were tested in accordance to ICEA T-27-581 and UL 44 by applying a 500 g load for 30 minutes at a temperature of 131° C.

TABLE 5

| | | Inventive Example | | | |
|---|---|---|---|---|---|
| | | 1 | 2 | 3 | 4 |
| Surface Quality (Tapes) | | Good | Good | Good | Good |
| Tensile + Elongation | Initial Tensile Strength | 3259 | — | 3526 | 3719 |
| | Initial Elongation at Break (%) | 661 | — | 661 | 684 |
| | Retained Tensile Strength (%) | 107 | — | 98 | 91 |
| | Retained Elongation at Break (%) | 87 | — | 78 | 79 |
| Hot Creep - Tapes (° C.) | | 97.6 | — | 68.5 | 63 |
| Hot Set - Tapes (° C.) | | 8.7 | — | 3.5 | 6.3 |
| Dry Electrical Testing - Plaques SIC RT/90 C./130 C. | | 2.19/2.13/1.85 | — | 2.29/2.08/1.79 | 2.31/2.11/1.85 |
| Dry Electrical Testing - Plaques Tan δ | | 0.02/0.01/0.11 | — | 0.02/0.01/0.185 | 0.01/0.00/0.02 |
| Dry Electrical Testing - Plaques IR | | */2.13E+14/2.17E+12 | — | 5.61E+14/1.17E+13/5.66E+11 | */*/3.54E+12 |
| Wire Extrusion Surface | | Moderate | Moderate | Moderate | Moderate |
| Hot Creep - Wires | | 80.8 (7 days) | 26.9 (14 days) | 75.4 (7 days) | 69 (7 days) |
| Hot Set - Wires | | 0.40% | −5.80% | 3.10% | 2.90% |
| Deformation of Crosslinked Wire | | 25% | — | 18.60% | — |

TABLE 6A

| | | Comparative Example | | | | |
|---|---|---|---|---|---|---|
| | | 5 | 6 | 7 | 8 | 9 |
| Surface Quality - Tapes | | Good | Good | Good | Good | Good |
| Tensile + Elong. | Initial Tensile Strength | 2228 | — | 3571 | 4752 | 4809 |
| | Initial Elongation at break (%) | 579 | — | 719 | 648 | 637 |
| | Retained Tensile % | 123 | — | 92 | 90 | 95 |
| | Retained Elongation % | 113 | — | 75 | 80 | 89 |
| Hot Creep - Tapes | | 74.8 | — | 93.7 | 131.5 | 154.2 |
| Hot Set - Tapes | | 1.9 | — | 14.2 | 9.1 | 9.1 |
| Dry Electrical Testing - Plaques SIC RT/90° C./130° C. | | 2.3/2.09/1.85 | — | 2.27/2.14/1.85 | 2.27/2.12/1.85 | 2.245/2.06/1.78 |
| Dry Electrical Testing- Plaques Tan δ | | 0.01/0.01/0.275 | — | 0.01/0.00/0.01 | 0.01/0.0/0.045 | 0.010/0.01/0.085 |
| Dry Electrical Testing- Plaques IR | | */2.13E+14/1.437E+13 | — | 1.28E+15/1.49E+15/4.45E+13 | 2.49E_15/1.72E+14/6.99E+12 | */4.28E+13/1.545E+13 |
| Wire Extrusion Surface | | | — | Moderate | — | Fail |
| Hot Creep - Wires | | 65.4 (7 days) | — | 93.1 (9 days) | — | Broke (7 days) |
| Hot Set - Wires | | −11.50% | — | 7.3 | — | Broke (7 days) |
| Deformation of Crosslinked Wire | | 38.40% | — | 21.60% | — | 42.00% |

TABLE 6B

| | | Comparative Example | | | |
|---|---|---|---|---|---|
| | | 10 | 11 | 12 | 13 |
| | Surface Quality - Tapes | Good | Good | Dull | Good |
| Tensile + Elong. | Initial Tensile Strength | — | — | — | — |
| | Initial Elongation at break (%) | — | — | — | — |
| | Retained Tensile % | — | — | — | — |
| | Retained Elongation % | — | — | — | — |
| Hot Creep - Tapes | | — | — | — | — |
| Hot Set - Tapes | | — | — | — | — |
| Dry Electrical Testing - Plaques SIC RT/90° C./130° C. | | — | 2.3/2.15/1.85 | 2.32/2.24/1.93 | 1.87/1.775/1.55 |
| Dry Electrical Testing - Plaques Tan D | | — | 0.01/0.00/0.03 | 0.02/0.01/0.04 | 0.02/0/0.015 |
| Dry Electrical Testing - Plaques IR | | — | 1.30E+15/ 3.98E+14/ 1.10E+13 | */8.68E+14/ 1.91E+13 | 9.67E+14/ */* |
| Wire Extrusion Surface | | — | — | — | — |
| Hot Creep - Wires | | — | — | — | — |
| Hot Set - Wires | | — | — | — | — |
| Deformation of Crosslinked Wire | | — | — | — | — |

As indicated by Tables 1, 3, and 5, Inventive Examples 1 to 4 exhibited excellent properties and were suitable for use as a, crosslinked or thermoplastic covering layer on cables. In contrast, Comparative Examples 5 to 13 were unsuitable for cable coverings because they exhibited one or more unsuitable properties in either the LLDPE polymer or unsuitable properties when formed as a cable covering.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A cable comprising:
   one or more conductive elements; and
   a covering layer surrounding the one or more conductive elements, the covering layer formed from a crosslinked linear low-density polyethylene polymer; and
   wherein the linear low-density polyethylene polymer has a $M_z$ of about 900,000 daltons to about 1,200,000 daltons and exhibits a $M_z/M_n$ molecular weight distribution of about 20 to about 40; and
   wherein the covering layer exhibits a retained elongation at break after heat aging at 121° C. for 7 days that is greater than 76% of the unaged elongation at break percentage.

2. A cable comprising:
   one or more conductive elements; and
   a covering layer surrounding the one or more conductive elements, the covering layer formed from a linear low-density polyethylene polymer; and
   wherein the linear low-density polyethylene polymer exhibits a $M_z/M_n$ molecular weight distribution of 25 to 40 and a melt index of 0.8 to 2.

3. A cable comprising:

one or more conductive elements; and an extruded covering layer surrounding the one or more conductive elements, the covering layer formed from a crosslinked linear low-density polyethylene polymer; and wherein the linear low-density polyethylene polymer exhibits one or more of a $M_z/M_n$ molecular weight distribution of about 20 to about 40 and a hot set value of about 10% or less when evaluated as a crosslinked tape sample in accordance to ICEA T-28-562.

4. The cable of claim 1, wherein the linear low-density polyethylene polymer exhibits a melt index of 0.9 to 2.

5. The cable of claim 1, wherein the linear low-density polyethylene polymer exhibits a $\eta^*0.01/\eta^*100$ viscosity ratio of about 2 to about 8.

6. The cable of claim 1, wherein the linear low-density polyethylene polymer exhibits a polydispersity of about 2.5 to about 8.

7. The cable of claim 1, wherein the linear low-density polyethylene polymer exhibits a peak melting temperature of about 119° C. to about 127° C.

8. The cable of claim 1, wherein the linear low-density polyethylene is formed with one or more of a 1-butene co-monomer and a 1-hexene co-monomer.

9. The cable of claim 1, wherein the linear low-density polyethylene is formed using metallocene catalysts.

10. The cable of claim 1, wherein the covering layer is an insulation layer.

11. The cable of claim 1, wherein the linear low-density polyethylene exhibits a hot set value of about 10% or less when evaluated as a tape sample in accordance to ICEA T-28-562.

12. The cable of claim 1, wherein the linear low-density polyethylene polymer is crosslinked using a silane crosslinking process.

13. The cable of claim 1, wherein the covering layer is a jacket layer.

14. The cable of claim 13, wherein the linear low-density polyethylene polymer is thermoplastic.

15. The cable of claim 13, wherein the jacket layer passes the ASTM D1693 Environmental Stress Crack Resistance test.

16. The cable of claim 1 having a tan δ of about 0.3% or less when measured at about 130° C.

* * * * *